(12) United States Patent
Alasti et al.

(10) Patent No.: US 6,263,390 B1
(45) Date of Patent: Jul. 17, 2001

(54) TWO-PORT MEMORY TO CONNECT A MICROPROCESSOR BUS TO MULTIPLE PERIPHERALS

(75) Inventors: Ali Alasti, Los Altos; Govind V. Malalur, Fremont, both of CA (US)

(73) Assignee: ATI International SRL, Hastings (BB)

( * ) Notice: Subject to any disclaimer, the term of this patent is extended or adjusted under 35 U.S.C. 154(b) by 0 days.

(21) Appl. No.: 09/136,209

(22) Filed: Aug. 18, 1998

(51) Int. Cl.[7] .................................................. G06F 13/00
(52) U.S. Cl. ................................. 710/129; 710/127; 710/1
(58) Field of Search ......................... 710/1, 22, 126–130, 710/149

(56) References Cited

U.S. PATENT DOCUMENTS

| | | | | |
|---|---|---|---|---|
| 4,862,407 | * | 8/1989 | Fette et al. ............................. | 712/35 |
| 4,999,768 | * | 3/1991 | Hirokawa ............................. | 709/253 |
| 5,291,609 | * | 3/1994 | Herz ...................................... | 710/52 |
| 5,469,549 | * | 11/1995 | Simpson et al. ..................... | 709/213 |
| 5,721,722 | * | 2/1998 | Kato et al. ............................ | 364/131 |
| 5,852,608 | * | 12/1998 | Csoppenszky et al. ............. | 370/465 |
| 5,884,099 | * | 3/1999 | Klingelhofer ......................... | 710/52 |
| 5,884,100 | * | 3/1999 | Normoyle et al. ..................... | 710/52 |
| 5,898,889 | * | 4/1999 | Davis et al. ........................... | 711/130 |
| 5,948,080 | * | 9/1999 | Baker .................................... | 710/37 |
| 5,999,478 | * | 12/1999 | Proebsting ....................... | 365/230.05 |

* cited by examiner

*Primary Examiner*—Paul R. Myers
(74) *Attorney, Agent, or Firm*—Skjerven Morrill MacPherson LLP; Edward C. Kwok, Esq.

(57) ABSTRACT

The present invention provides a two-port memory to connect a microprocessor bus to multiple peripherals. In one embodiment, an apparatus for an IO gateway subsystem of a microprocessor includes a bus of the microprocessor connected to a two-port memory, and a first peripheral connected to the two-port memory and a second peripheral connected to the two-port memory. In particular, the two-port memory communicates with the bus at a first clock rate, the two-port memory communicates with the first peripheral at a second clock rate, and the two-port memory communicates with the second peripheral at a third clock rate, in which the first clock rate, the second clock rate, and the third clock rate are asynchronous (e.g., the clocks have different phases, or the clocks have different frequencies).

17 Claims, 4 Drawing Sheets

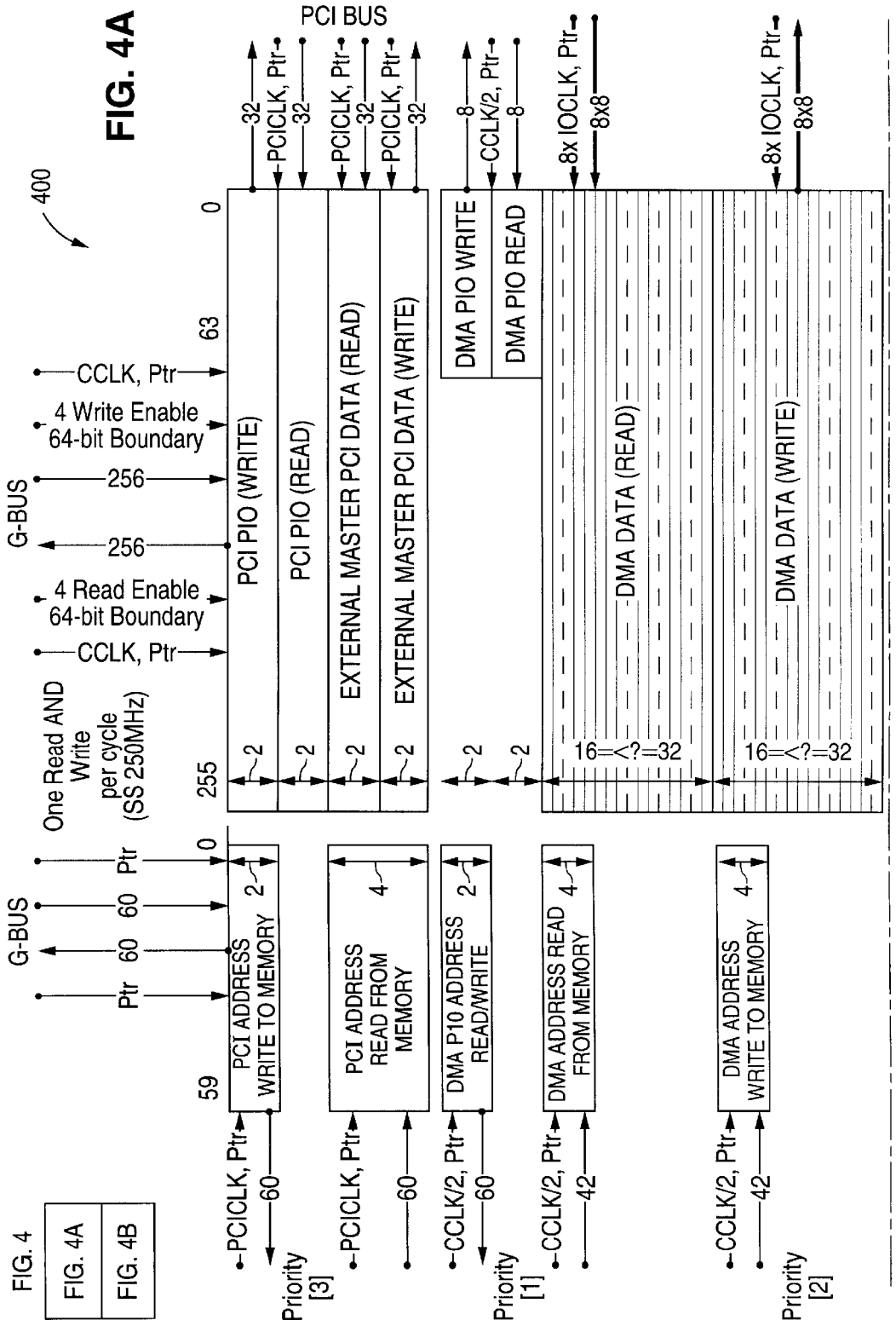

TWO-PORT MEMORY TO CONNECT A MICROPROCESSOR BUS TO MULTIPLE PERIPHERALS

FIELD OF THE INVENTION

The present invention relates generally to microprocessors and, more particularly, to an IO (Input Output) gateway subsystem of a microprocessor that includes a two-port memory to connect a microprocessor bus to multiple peripherals.

BACKGROUND OF THE INVENTION

A microprocessor typically includes an IO (Input Output) gateway subsystem for connecting multiple peripherals to a microprocessor bus. A system memory and controller is also typically connected to the microprocessor bus. Specifically, the IO gateway subsystem acts as a gateway between multiple IO devices and the microprocessor bus. The IO gateway allows the multiple IO devices to transfer data to and from the system memory via the microprocessor bus.

More specifically, the IO gateway subsystem of a microprocessor typically includes various interfaces that manage read and write requests between the multiple IO devices and the microprocessor bus. An interface such as a DMA (Direct Memory Access) interface typically includes a DMA engine that queues the read and write requests of multiple DMA devices in a shared DMA buffer. The DMA engine typically arbitrates access to the shared DMA buffer among the multiple IO devices.

SUMMARY OF THE INVENTION

The present invention provides a two-port memory to connect a microprocessor bus to multiple peripherals. For example, the present invention provides a cost-effective and high performance apparatus and method for an IO gateway subsystem of a microprocessor (e.g., a system) that includes a two-port memory to connect a microprocessor bus to multiple peripherals.

In one embodiment, an apparatus for an IO gateway subsystem of a microprocessor includes a first interface and a second interface (e.g., a DMA interface and a PCI interface, which can each be connected to multiple IO devices). A two-port memory of the IO gateway subsystem is connected to a global bus of the microprocessor. The two-port memory is also connected to the first interface and to the second interface. In particular, the first interface and the second interface arbitrate to access the microprocessor bus via the connection between the two-port memory and the microprocessor bus. The first interface is connected to a first buffer of the two-port memory via a first interface connection. Also, the second interface is connected to a second buffer of the two-port memory via a second interface connection. Accordingly, the first interface is not required to arbitrate with the second interface to access the first buffer of the two-port memory, and the second interface is not required to arbitrate with the first interface to access the second buffer of the two-port memory.

In one embodiment, an apparatus for an IO gateway subsystem of a microprocessor includes a two-port memory. The two-port memory of the IO gateway subsystem is connected to a global bus of the microprocessor. In particular, the connection between the two-port memory and the global bus of the microprocessor is synchronized with a global clock (e.g., a CPU (Central Processing Unit) clock that is characterized by a frequency and a phase). The two-port memory of the first interface includes a first buffer for a first IO device and a second buffer for a second IO device. The first buffer is connected to the first IO device via a first IO device connection. Also, the second buffer is connected to the second IO device via a second IO device connection. In particular, the first IO device connection is synchronized with a first IO device clock, and the second IO device connection is synchronized with a second IO device clock. The first IO device clock rate and the second IO device clock rate can be different (asynchronous), and further, the first IO device clock rate, the second IO device clock rate, and the global clock rate can all be different. Moreover, the first IO device is not required to arbitrate with the second IO device to access the first buffer of the two-port memory, and similarly, the second IO device is not required to arbitrate with the first IO device to access the second buffer of the two-port memory.

In one embodiment, the IO gateway subsystem includes a PCI (Personal Computer Interface), a display interface, and a DMA interface. Each of the interfaces is connected to its own buffer of a two-port memory. Thus, the interfaces do not arbitrate with each other to access their own buffer of the two-port memory. The two-port memory is also connected to a global bus of the microprocessor. The DMA interface is connected to multiple IO devices (e.g., eight IO devices). The two-port memory connected to the DMA interface includes a buffer for each IO device. Each IO device has its own connection to its buffer. Thus, the IO devices do not arbitrate with each other to access the two-port memory. Further, each IO device operates on its own clock, and the synchronization between the DMA buffers and the IO devices is handled by the DMA interface. Alternatively, synchronization is not required (e.g., the clock rates can have identical frequencies but asynchronous phases, or also have asynchronous frequencies) if the IO devices operate on a divided synchronous clock with respect to the DMA interface clock.

In one embodiment, a method includes communicating via a first port of a bank (e.g., a cache line or multiple cache lines) of a two-port memory at a first clock rate (e.g., frequency and phase) with a first peripheral, and communicating via a second port of the bank of the two-port memory with a bus of a microprocessor at a second clock rate (e.g., frequency and phase), in which the first and second clocks can have different (asynchronous) frequencies, or the first and second clocks can have different phases (when the frequencies are identical).

Other aspects and advantages of the present invention will be come apparent from the following detailed description and the accompanying drawings.

DETAILED DESCRIPTION OF THE INVENTION

The present invention provides an apparatus and a method for a two-port memory to connect a microprocessor bus to multiple peripherals. For example, an IO gateway subsystem of a microprocessor that connects multiple peripherals (e.g., interfaces or IO devices) to a bus of a microprocessor would particularly benefit from the apparatus and the method of present invention. In one embodiment, an apparatus of the present invention provides a cost-effective and high performance IO gateway subsystem that includes a two-port memory that connects multiple peripherals to a microprocessor bus. In particular, the multiple peripherals each have their own connection to the two-port memory and perform accesses to the two-port memory a synchronously (e.g., relative to various clocks of the peripherals), and accesses from the two-port memory to the microprocessor bus are performed synchronously relative to a CPU (Central Processing Unit) clock.

Figure 1:
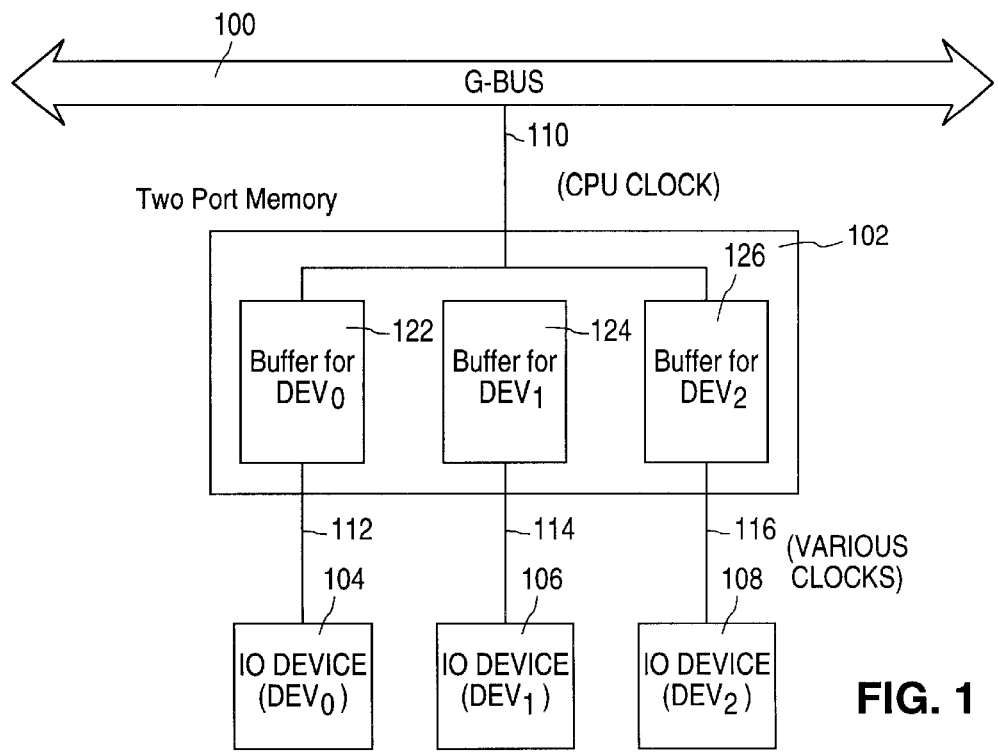
FIG. 1 is a block diagram of an IO gateway subsystem of a microprocessor in accordance with one embodiment of the present invention.

FIG. 1 is a block diagram of an IO gateway subsystem of a microprocessor in accordance with one embodiment of the present invention. A two-port memory 102 connects to multiple peripherals, and in particular, IO device 104 ($DEV_0$), IO device 106 ($DEV_1$), and IO device 108 ($DEV_2$) through connections 112, 114, and 116, respectively. A global bus (G-bus) 100 of the microprocessor connects to memory 102 through a connection 110.

Two-port memory 102 represents a shared communication data buffer (i.e., an integrated memory) with concurrent access for independent devices (e.g., IO devices 104, 106, and 108). In one embodiment, the independent devices can be interfaces such as a DMA interface, a PCI interface, and a display interface to provide a first level of integration of an IO gateway memory as further discussed below with respect to FIG. 2, or the independent devices can be IO devices connected to an interface such as a DMA interface, to provide a second level of integration of an IO gateway memory as further discussed below with respect to FIG. 2.

Each bank of two-port memory 102 includes two ports: a first port connects the bank to G-bus 100, and a second port connects the bank to a particular IO device, as further discussed below with respect to FIG. 5. In particular, communication over connection 110 is performed relative to a CPU clock. But, communications over connections 112, 114, and 116 are performed relative to various clocks (e.g., synchronous to different clock rates of clocks of IO devices 104, 106, and 108). Accordingly, the two port structure of memory 102 allows for the clock rate independence of communications over connection 110 and over connections 112, 114, and 116.

Further, memory 102 includes a buffer for each IO device, and in particular, buffer 122 for IO device 104, buffer 124 for IO device 106, and buffer 126 for IO device 108. Also, connection 110 is generally higher bandwidth than connections 112, 114, and 116. Accordingly, IO devices 104, 106, and 108 communicate with memory 102 in parallel. In other words, IO devices 104, 106, and 108 are not required to arbitrate with each other in order to communicate with buffers 122, 124, and 126, respectively, of two-port memory 102. Thus, IO devices 104, 106, and 108 send read and write requests to two-port memory 102 independently, and from the perspective of a particular IO device, two-port memory 102 is available independent of any other IO device.

In one embodiment, two-port memory 102 includes buffers that are programmably allocated among the IO devices either statically (e.g., initialized upon reset) or dynamically (e.g., dynamically reconfigurable/programmable). For example, if at a particular time, IO device 104 is transmitting a significant amount of data relative to IO devices 106 and 108, then a relatively larger size buffer of two-port memory 102 is allocated to IO device 104. Thus, buffer 122 would be larger in size than buffer 124 and buffer 126. Accordingly, this embodiment provides for efficient use of the storage space of two-port memory 102 relative to the dynamic buffer requirements of IO devices 104, 106, and 108. The programmable allocation of two-port memory 102 among the IO devices is further discussed below with respect to FIG. 5.

Figure 2:
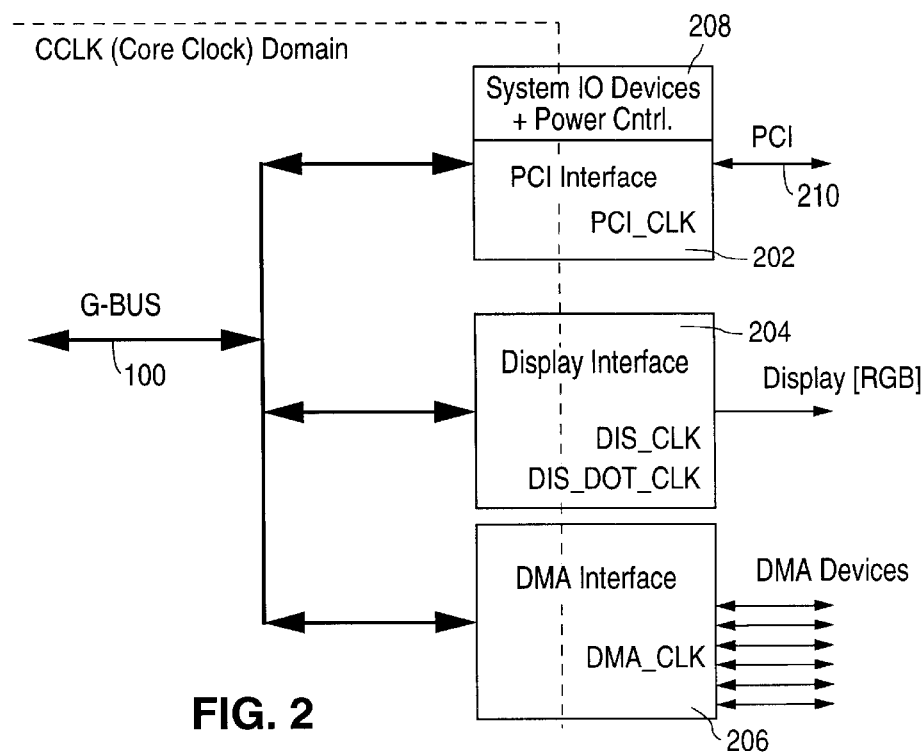
FIG. 2 is a block diagram of various interfaces of an IO gateway subsystem of a microprocessor in accordance with one embodiment of the present invention.

FIG. 2 is a block diagram of various interfaces of an IO gateway subsystem of a microprocessor in accordance with one embodiment of the present invention. In particular, the IO gateway subsystem acts as a gateway between the IO subsystem and global bus (G-bus) 100. The IO gateway operates on the G-bus clock domain (called the core clock (CCLK) domain). The IO gateway also handles the synchronization between the CPU and various device clock domains.

PCI interface 202 operates in the PCI clock domain (PCI_CLK), and the IO gateway handles synchronization between the two clock domains. In particular, the IO gateway allows the CPU (e.g., a CPU read or CPU write request via G-bus 100) to access PCI bus 210. PCI bus masters can transfer data to or from the system memory through the IO gateway. Data buffering in PCI interface 202 allows for fast transfer of data between G-bus 100 and PCI bus 210. PCI interface 202 supports PCI bus arbitration, PCI bus configuration, and a standard PCI to ISA bridge. In particular, the IO gateway supports 2×64-bit write buffers for CPU access to PCI bus 210 and a 32-byte (256-bit) CPU read buffer for assembling PCI reads for CPU access. The IO gateway also supports a 2×32-byte PCI master read buffer and a 2×32-byte PCI write master buffer, which allow for fu Accordingly, this embodiment allows for a high speed PCI interface.

In one embodiment, there can be a maximum of two outstanding PIO requests to PCI interface 202 (i.e., CPU mastered accesses to the PCI bus). The requests can be any combination of read or write operations. PCI interface 202 accepts the requests in a strict circular FIFO order. The IO gateway stores the operation in a strict FIFO order. Accordingly, the strict ordering at PCI interface 202 and the IO gateway ensures that any read operation following a write operation will result in the write operation being seen first and then the read operation. In case the CPU needs to ensure that a write operation is completed, the CPU can read a standard port such as a PCI configuration register of PCI interface 202. The completion of the read guarantees that the write is also completed. A PIO operation has a transaction ID associated with it. Because PCI interface 202 returns the same transaction ID when the corresponding read is completed along with the read data, multiple outstanding requests can thus be queued and tracked. Also, even though two read operations can be queued, PCI interface 202 returns data one at a time as there is only one read port to store the data. PCI interface 202 supplies the next read data after the read port becomes free (i.e., the data has been supplied to the CPU). The write operation can be to any address on PCI bus 210, and PCI interface 202 routes the 64-bit data accordingly. PCI interface 202 includes 64-bit data buffers, and thus, the CPU can do a direct 64-bit operation onto PCI devices. Alternatively, PCI interface 202 includes 32-bit buffers, and thus, the CPU can perform a direct 32-bit operation onto PCI devices.

Further, PCI interface 202 can run at a clock rate that is a multiple of the CPU clock rate (e.g., 14.318 Mhz), which allows PCI interface 202 and power control block 208 to run in a synchronous manner. Accordingly, while the PCI clock is powered down, the power control clock can continue running, and the CPU can program various power control registers to orderly reduce power in the system. In the final phase, the power control block can power down all of the CPUs (i.e., assuming multiple CPUs) and wake up selected CPUs based on a programmable DUTY cycle. Accordingly, power control block 208 simplifies the handling of low power in the microprocessor. For example, most PLL control register bits can be generated from this module thereby simplifying the clock control circuitry and also the confusion as to which clocks should be kept active for a proper low power sequencing. On start up (reset), clocks (CCLK) for the CPU, G-bus 100, the IO gateway, and PCI bus 210 are running. Power control block 208 can enable these clocks (PLLs) on reset as a default. The remaining clocks can be controlled through BIOS/software.

Display interface 204 operates in the display clock domain (DIS_CLK). In particular, the IO gateway handles synchronization between the two clock domains, and the IO gateway supports a 2×32-byte read buffer for fetching display data requested by the display controller. A 2×32-bit port is used to write data to a display FIFO for PIO and test purposes. The display controller includes its own buffers (e.g., FIFOs) so that display interface 206 is minimally dependent on the system memory latencies. Configuration and control registers for the display interface can be read or written by the CPU through the PIO address space. The IO gateway supports a 128-bit path for the display interface to read data from the system memory. A 32-bit path allows the CPU to read the PIO ports and display FIFO primarily for test purposes. The display controller can pipeline two read requests to fetch data from G-bus 100. The two read requests can specify any address on G-bus 100, and each address will result in the IO gateway fetching a cache line of data.

In one embodiment, there can be a maximum of two outstanding PIO requests to display interface 204, which can be any combination of read or write operations. Display interface 204 accepts the requests in a strict circular FIFO order. The IO gateway stores the operation in a strict FIFO order. Accordingly, this ensures that any read following a write will result in the write operation to be seen first and then the read operation. In case the CPU needs to ensure that a write operation is completed, the CPU can read a standard port such as a display configuration register. The completion of the read guarantees that the write is also completed. A PIO operation has a transaction ID associated with it. Display interface 204 returns the same transaction ID when the corresponding read is complete along with the read data, which ensures multiple outstanding requests can be queued and tracked. Accordingly, even though two read operations can be queued, display interface 204 returns data one at a time as there is only one read port to store the read data. Display interface 204 supplies the next read data after this read port becomes free (i.e., the data has been transmitted to the CPU via G-bus 100 and read by the CPU). The write port is 32-bits wide and cache line address aligned. The cache line address alignment reduces the logic to multiplex 256-bit G-bus 100 onto any byte address on display interface 204. A PIO read or write operation to display interface 204 uses the lower 32 bits of the data bus (bits 31:0). Also, sequential addresses are cache line address aligned, not byte aligned. Software ensures the proper address (e.g., cache line boundary aligned) and size (e.g., 1, 2, 3, or 4 bytes) for the PIO operation. The two PIO addresses are also tagged by a valid bit to indicate that a PIO operation is pending. Display interface 204 then fetches the PIO operation from the queue, clears the valid tag (a one clock duration pulse), and completes the PIO operation. If the PIO operation is a read, then the read data along with the transaction ID is returned to the IO gateway, and a data valid tag is set to indicate completion of the read. If the operation is a write, then the write is performed, and the address valid bit is cleared.

DMA interface 206 operates in the DMA clock domain (DMA_CLK), the IO gateway handles synchronization between the two clock domains. In particular, DMA_CLK can operate at a CCLK/2 bus frequency or CCLK/N, or DMA_CLK can be selected to be asynchronous to the IO gateway clock. The DMA_CLK can be selected to be a multiple of the various frequencies used for the supported DMA devices. For example, the supported DMA devices include a communication CODEC, AC97, SPDIF, Ethernet, 1394, and video CODEC. By selecting a multiple of the frequencies of the various DMA devices, the synchronization between a DMA engine of DMA interface 206 and most of the DMA devices can be eliminated thereby reducing logic and complexity of the interface between the DMA engine and the various DMA devices. Further, a DMA interface 206 can perform one read request and one write request, which results in the IO gateway initiating a DMA transaction on G-bus 100. PIO access to DMA interface 206 is provided through a 32-bit data path, and two PIO requests can be pending at any time for the DMA interface.

Figure 3:
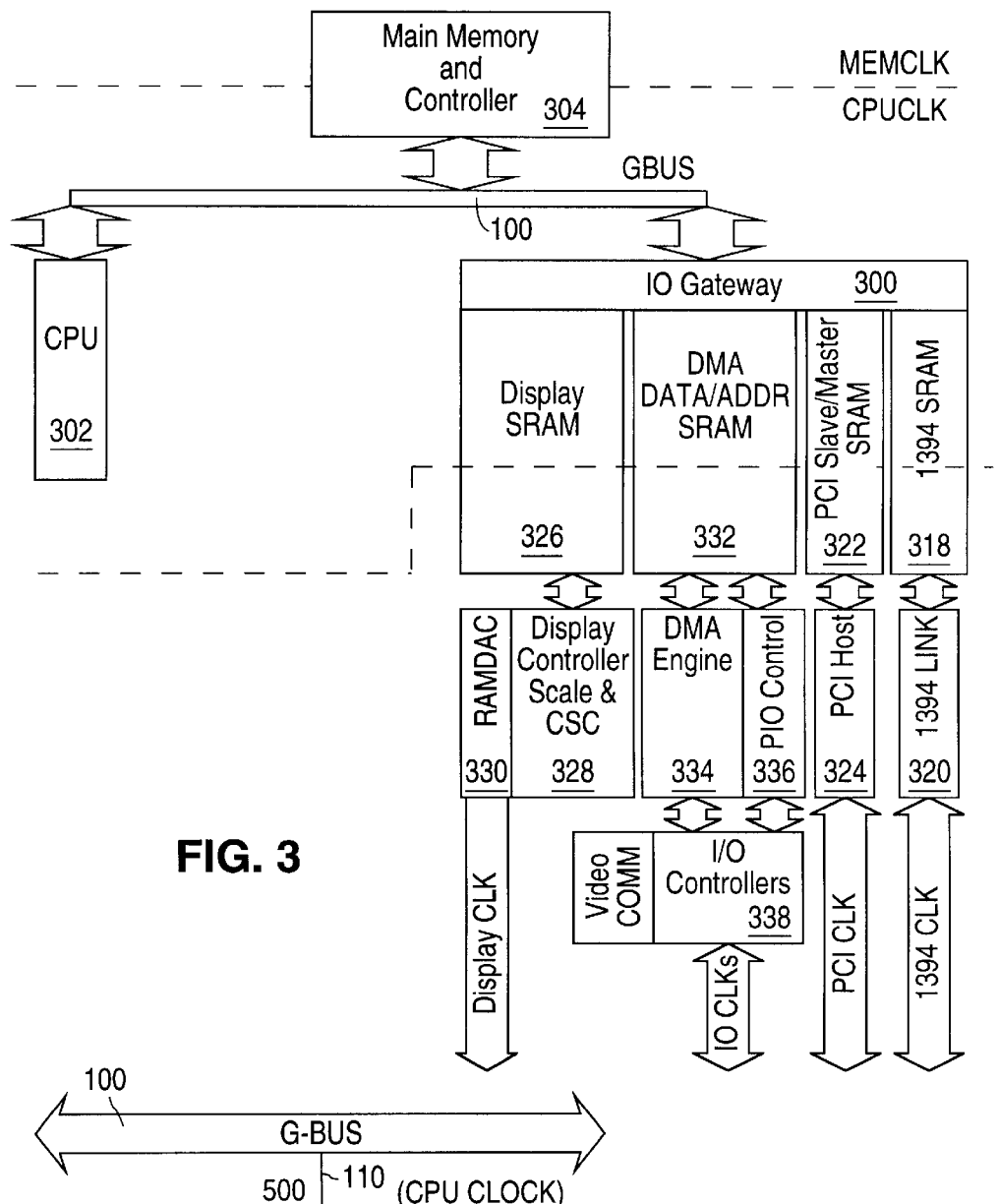
FIG. 3 is a functional diagram of the IO gateway subsystem of FIG. 2 shown in greater detail in accordance with one embodiment of the present invention.

Further, in one embodiment, DMA interface 206 includes one buffer per DMA device. Each DMA device operates on its own clock. If multiple DMA devices supported, then the synchronization between the DMA buffers and the DMA devices can be handled by DMA interface 206. This synchronization is eliminated if the DMA devices operate on a divided synchronous clock with respect to the DMA clock (DMA_CLK). Further, although some DMA devices may run off of a divided synchronous clock, a few of the peripherals may need their own clock, asynchronous to the DMA clock. The DMA interface is further discussed below with respect to FIG. 3. FIG. 3 is a functional diagram of the IO gateway subsystem of FIG. 2 shown in greater detail in accordance with one embodiment of the present invention. In particular, IO gateway 300 is connected to G-bus 100, a CPU 302 is connected to G-bus 100, and a main memory and controller subsystem 304 is connected to G-bus 100. Thus, G-bus 100 (e.g., the global bus of CPU 302) is connected to IO gateway 300, CPU 302, and main memory and controller subsystem 304. Main memory and controller subsystem 304 provides a gateway to the main memory of the microprocessor, which is used as a shared memory for the microprocessor. CPU 302 can be implemented by a standard CPU or multiple CPUs (i.e., a multiprocessor). In one embodiment, the CPU clock is a 250 Mhz clock, and the main memory clock (MEMCLK) is a 75 Mhz clock.

IO gateway 300 includes a PCI interface (e.g., PCI interface 202), a display interface (e.g., display interface 204), a DMA interface (e.g., DMA interface 206), and a 1394 interface. The 1394 interface includes a 1394 static random access memory (SRAM) unit 318 (e.g., a 1394 memory) that is connected to a 1394 link 320. The 1394 interface is in the 1394 clock domain as shown in FIG. 3. The PCI interface includes a PCI Slave/Master SRAM unit 322 (e.g., a PCI memory) that is connected to a PCI host 324. The PCI interface is in the PCI clock domain as shown in FIG. 3. The display interface includes a display SRAM unit 326 (e.g., a display memory) that is connected to a display controller 328 and a RAMDAC 330. The display interface is in the display CLK domain as shown in FIG. 3.

The DMA interface includes a DMA data/address SRAM unit 332 (e.g., a DMA memory) that is connected to a DMA engine 334 and a PIO control 336. The DMA engine 334 and PIO control 336 are each connected to IO controllers 338. IO controllers 338 can be standard IO controllers. IO controllers 338 also include a video communication circuit. By selecting a multiple of the frequencies of the various IO devices, the synchronization between DMA engine 334 and the IO devices can be eliminated thereby reducing logic and complexity of the interface between DMA engine 334 and the IO devices. Accordingly, this embodiment allows for a simple asynchronous interface between IO gateway 300 and DMA engine 334.

Further, DMA data/address SRAM unit 332 includes a device buffer for each supported IO device (e.g., buffer 122, 124, and 126 for IO devices 104, 106, and 108, respectively). Each IO device runs off its own clock. Multiple IO devices are supported (e.g., eight IO devices). Synchronization between the DMA buffers and the IO devices is handled by DMA engine 334. This synchronization by DMA engine 334 is eliminated (i.e., not required) if the IO devices operate on a divided synchronous clock with respect to the DMA engine clock. Although some of the IO devices may run off a divided synchronous clock, a few of the IO devices may run off a clock that is asynchronous to the DMA engine clock.

In one embodiment, the PCI clock rate ranges from 0 to 66 Mhz, the IO clock rate ranges from 0 to 50 Mhz, the display clock rate ranges from 0 to 250 Mhz, the CPU clock rate ranges from 250 to 300 Mhz, and the main memory clock rate ranges from 0 to 75 Mhz.

Figure 5:
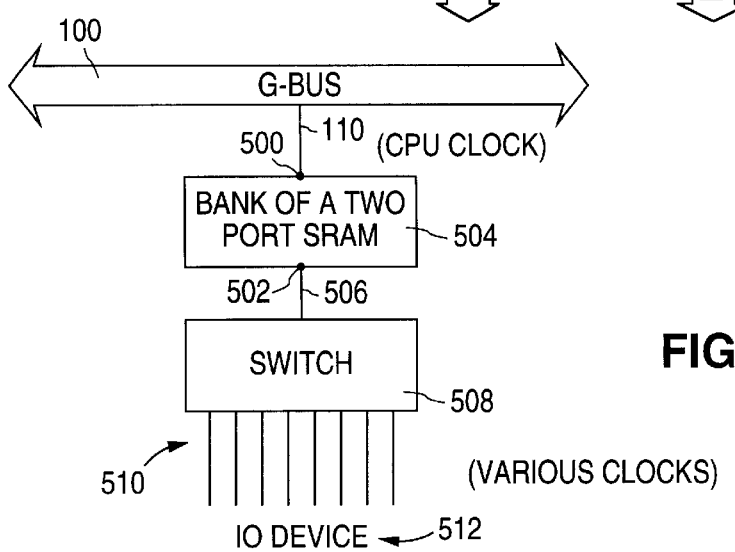
FIG. 5 is a block diagram of a bank of the integrated SRAM unit of FIG. 4 that is two ported and connected to a switch in accordance with one embodiment of the present invention.

In one embodiment, each buffer in DMA data/address SRAM 322 is connected to at most one IO device channel (e.g., IO device channels 510 of FIG. 5). Thus, an IO device connect to an IO device channel can access the buffer connected to the IO device channel independently of any other IO device. A buffer can be 2×32 bytes deep (i.e., two cache lines) or 4×32 bytes deep (i.e., four cache lines) (e.g., for video IO devices). Some IO devices may require larger or smaller buffers depending on the amounts of data being transmitted across IO gateway 300.

PIO control unit 336 provides DMA interface PIO (Programmed Input Output) functionality. In one embodiment, the DMA interface supports a maximum of two levels of write posting for DMA PIO accesses. The DMA interface can implement its own write posting buffers depending on the number of PIO devices (e.g., residing outside of the microprocessor or die). The DMA interface provides at least one level of write posting and one write buffer for each PIO device. In particular, the DMA interface provides a separate 32-bit PIO read port to optimize PIO read operations. The DMA interface is capable of continuing DMA operations in progress while the PIO operations are run in parallel. PIO read operations to registers within the microprocessor can complete within a fixed duration. No special optimizations are required. For accesses to registers outside the microprocessor, the DMA interface can accept the PIO read command and indicate command accepted to IO gateway 300. The DMA interface can then fetch the requested port data and supply it to IO gateway 300 with the transaction ID, which is referred to as a deferred read operation. Once the DMA interface indicates the operation is complete along with the transaction ID, the data is passed to the original requesting CPU 302. The DMA interface can allow multiple such reads to operate in parallel. However, the data return will be one after the other as there is only one common port to return the data. The DMA interface can optimize how many outstanding reads are pending based on the type of device and the latency to access the devices. If the DMA interface does not indicate that the read operation is accepted, then IO gateway 300 blocks further read operations to the DMA interface once the two PIO request queue entries are full. IO gateway 300 can queue up two PIO operations (read or write) for the DMA interface. The number of simultaneous read operations that the DMA interface can track depends on the complexity of DMA engine 334 and also on the number of IO devices with PIO registers external to the microprocessor. A maximum of one deferred read operation per IO device residing outside of the microprocessor is supported. Accordingly, this mechanism results in a maximum concurrence between operations and reduces the risk of one slow IO device slowing down any other device or interface.

IO controllers 338 connect multiple IO devices (e.g., eight IO devices) to DMA engine 334. DMA engine 334 assigns new addresses to tag entries in DMA data/address SRAM unit 332 for data coming in from the IO devices. Accordingly, the tagging mechanism performed by DMA engine 334 is performed on an arbitration basis among the various IO devices sending data to DMA engine 334. In other words, the address tagging is time-multiplexed. But from the perspective of the IO devices, the data is advantageously transmitted to and from DMA engine 334 to DMA data/address SRAM unit 332 independent of any other IO devices.

In one embodiment, the DMA interface includes 16 channels. In particular, the DMA interface includes eight input channels and eight output channels. In one embodiment, the DMA data/address SRAM unit 332 includes two cache lines per channel. Also, DMA data/address SRAM unit 332 includes only four cache lines for the eight out channels, which is generally sufficient if the G-bus 100 transmission rate is much faster than the transmission rate of data from the IO devices via the IO controllers 338 to DMA engine 334. However, four cache lines (or more) per channel, for example, can be provided for IO devices such as video IO devices, which may be transferring significant amounts of data (e.g., 500 megabytes) across IO gateway 300.

Figure 4B:
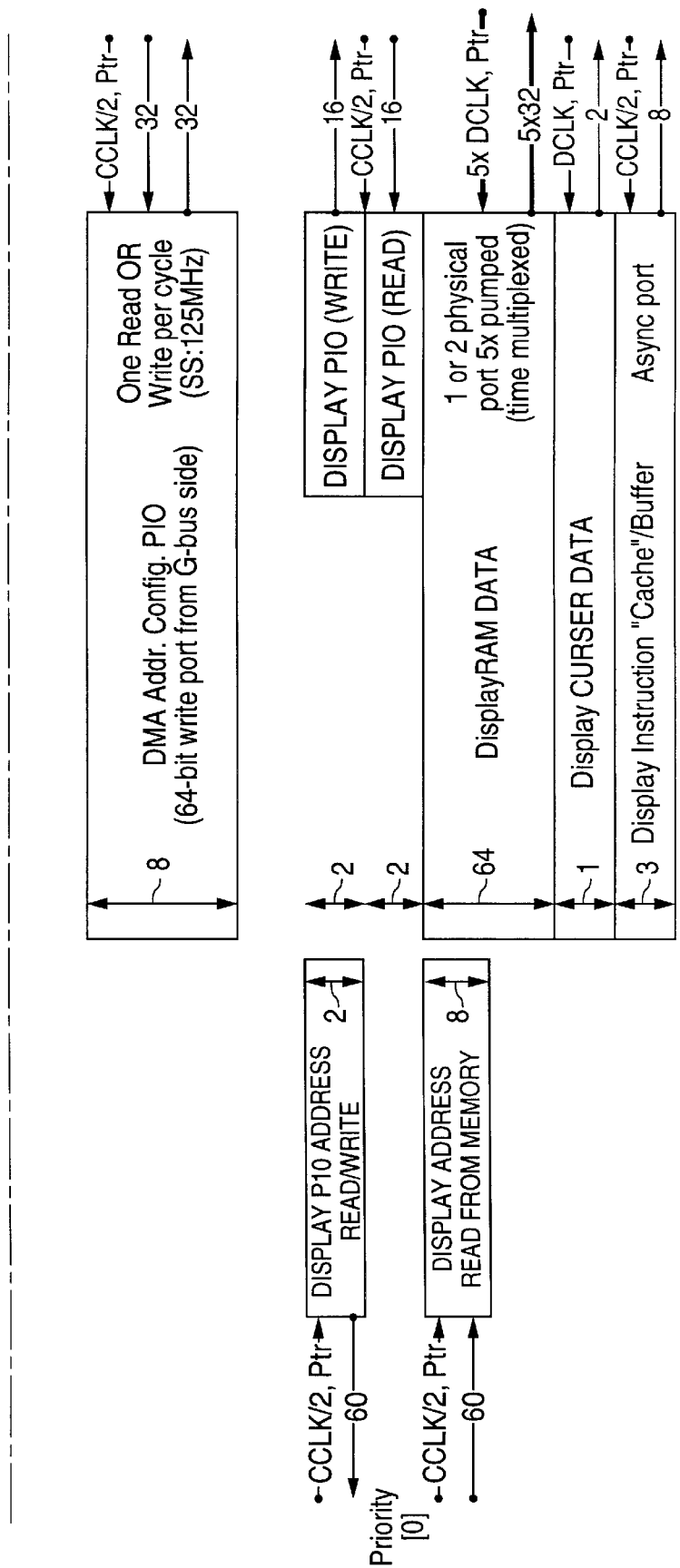
FIG. 4 is a block diagram of an integrated SRAM (Static Random Access Memory) unit of the IO gateway subsystem of FIG. 3 in accordance with one embodiment of the present invention.

FIG. 4 is a block diagram of an integrated SRAM unit 400 of the IO gateway subsystem of FIG. 3 in accordance with one embodiment of the present invention. In particular, integrated SRAM 400 includes various address buffers and various data buffers for the IO gateway subsystem of FIG. 3. In particular, integrated SRAM 400 includes buffers for the PCI interface, the display interface, and the DMA interface as discussed above with respect to FIGS. 2 and 3. Thus, 1394 SRAM unit 318, PCI slave/master SRAM unit 322, display SRAM unit 326, and DMA data/address SRAM unit 332 are all integrated into an integrated SRAM unit as shown in FIG. 4. Accordingly, integrated SRAM unit 400 efficiently integrates buffers slave/master IO and buffers address/data as shown in FIG. 4. Further, access to G-bus 100 from integrated SRAM unit 400 can be implemented using a fixed priority arbiter that provides a standard prioritized arbitration (e.g., priorities can be assigned as shown in FIG. 4).

FIG. 5 is a block diagram of a bank of integrated SRAM unit 400 of FIG. 4 that is two-ported and connected to a switch in accordance with one embodiment of the present invention. In particular, a first port 500 of a bank 504 of integrated SRAM unit 400 is connected to G-bus 100 via connection 110. A second port 502 of bank 504 is connected to a switch 508 via a connection 506. Switch 508 is connected to multiple IO devices 512 (e.g., eight IO devices) via IO device channels 510. In one embodiment, switch 508 provides a hard-wired connection from port 502 to a particular IO device. In another embodiment, switch 508 provides a static (i.e., configurable at reset or initialization) switch or a dynamically programmable switch, (e.g., implemented using a multiplexer) that can be configured to connect port 502 to any of the IO devices (but connecting port 502 to more than one IO device at a particular time would require that the IO devices connected to port 502 arbitrate to access bank 504, and thus, in one embodiment, only one IO device is connected to port 502 at a particular time).

Accordingly, the apparatus and the method of the present invention provides a two-port memory to connect a microprocessor bus to multiple peripherals. For example, the present invention can be used to provide a cost-effective and efficient IO gateway subsystem in a microprocessor. Moreover, a microprocessor that includes an IO gateway subsystem that connects multiple peripherals to a microprocessor bus would significantly benefit from the apparatus and the method of the present invention.

Although particular embodiments of the present invention have been shown and described, it will be obvious to those skilled in the art that changes and modifications may be made without departing from the present invention in its broader aspects, and therefore, the pending claims are to encompass within their scope all such changes and modifications that fall within the true scope of the present invention.

What is claimed is:

1. An apparatus comprising:
    a central processing unit;
    a processor bus coupled to the central processing unit;
    an IO gateway including a two-port memory, said two-port memory having a first port connected to the processor bus and a second port; and
    a first peripheral interface connected to the second port of the two-port memory and a second peripheral interface connected to a second port of the two-port memory, wherein the first peripheral interface communicates with the two-port memory at a first clock rate, the second peripheral interface communicates with the two-port memory at a second clock rate, and the two-port memory communicates with the processor bus at a third clock rate, wherein the first clock rate and the second clock rate are different from the third clock rate and wherein the processor bus having a higher bandwidth than each of the first and second peripheral device interfaces.

2. The apparatus of claim 1 wherein the first peripheral interface includes a DMA interface accessing the two-port memory using DMA (Direct Memory Access).

3. The apparatus of claim 1 wherein the first peripheral interface includes a display interface and wherein a first buffer in the two-port memory is provided as a display memory for the display interface.

4. The apparatus of claim 1 wherein the first peripheral interface includes a PCI interface wherein a first buffer in the two-port memory is provided for transactions on a PCI bus.

5. The apparatus of claim 1 wherein the first peripheral interface includes a 1394 interface wherein a first buffer in the two-port memory is provided for transactions on a 1394 bus.

6. The apparatus of claim 2 wherein the DMA interface further comprises:
    a DMA engine, wherein a first IO device is connected to the DMA engine, and a second IO device is connected to the DMA engine.

7. The apparatus of claim 6 wherein the first IO device communicates with the DMA interface at a first IO device clock rate, and the second IO device communicates with the DMA interface at a second IO device clock rate, and wherein the first IO device clock rate, the second IO device clock rate, and the third clock rate have asynchronous phases.

8. The apparatus of claim 7 wherein the connection to the first IO device is hard-wired, static, or dynamically programmable.

9. A method comprising:
    providing a two-port memory on a processor bus of a central processing unit;
    communicating via a first port of the two-port memory at a first clock rate with a first peripheral interface and at a second clock rate with a second peripheral interface, the first and second peripheral interfaces each provided a bandwidth less than the bandwidth of the processor bus; and
    communicating via a second port of the two-port memory with the processing bus at a third clock rate, wherein the first clock rate and the second clock rate are different from the third clock rate.

10. The method of claim 9 further comprising:
    storing data for the first peripheral interface in a first buffer in the two-port memory; and
    storing data for the second peripheral interface in a second buffer in the two-port memory.

11. The method of claim 10 wherein the first peripheral interface is coupled to a first IO device, and the second peripheral interface is coupled to a second IO device.

12. An apparatus for a microprocessor comprising:
    a processor bus of the microprocessor;
    a main memory and controller subsystem connected to the processor bus; and
    an IO gateway subsystem connected to the processor bus, the IO gateway subsystem comprising an integrated two-port memory, the integrated two-port memory coupled through a first port to the processor bus and including:
        a display memory connected to a display interface;
        a PCI memory connected to a PCI interface; and
        a DMA memory connected to a DMA interface, wherein the DMA interface comprises a DMA engine, a PIO control, and IO controllers connecting multiple IO devices to the DMA engine and the PIO control,
    wherein the integrated two-port memory communicates with the processor bus at a first clock rate, the display interface communicates with the integrated two-port memory at a second clock rate, the PCI interface communicates with the integrated two-port memory at a third clock rate, and the DMA interface communicates with the integrated two-port memory at a fourth clock rate, wherein the second, third and fourth clock rates are each different from the first clock rate, and wherein the processor bus has a bandwidth greater than the bandwidth of the display interface, the PCI interface or the DMA interface.

13. The apparatus of claim 12 wherein the DMA engine performs at a DMA clock rate, and the multiple IO devices transmit data to the DMA engine at one or more clock rates.

14. The apparatus of claim 12 wherein connection to each IO device is hard-wired, static, or dynamically programmable.

15. The apparatus of claim 12 wherein the DMA memory comprises:

two cache lines for each in channel, wherein each of the multiple IO devices is connected to the DMA memory via an in channel.

16. The apparatus of claim 15 wherein the DMA memory further comprises:

a cache line for each out channel, wherein each of the multiple IO devices is connected to the DMA memory via an out channel.

17. The apparatus of claim 12 wherein the DMA memory further comprises:

four cache lines for an in channel, wherein a video IO device is connected to the DMA memory via the in channel.

* * * * *